US011531089B2

(12) United States Patent
Schardt et al.

(10) Patent No.: US 11,531,089 B2
(45) Date of Patent: Dec. 20, 2022

(54) COAXIAL SETUP FOR LIGHT DETECTION AND RANGING, LIDAR, MEASUREMENTS

(71) Applicant: Blickfeld GmbH, Munich (DE)

(72) Inventors: Michael Schardt, Munich (DE); Markus Rauscher, Munich (DE)

(73) Assignee: Blickfeld GMBH, Munich (DE)

( * ) Notice: Subject to any disclaimer, the term of this patent is extended or adjusted under 35 U.S.C. 154(b) by 309 days.

(21) Appl. No.: 16/771,935

(22) PCT Filed: Sep. 4, 2019

(86) PCT No.: PCT/EP2019/073602
§ 371 (c)(1),
(2) Date: Jun. 11, 2020

(87) PCT Pub. No.: WO2020/049055
PCT Pub. Date: Mar. 12, 2020

(65) Prior Publication Data
US 2021/0173048 A1 Jun. 10, 2021

(30) Foreign Application Priority Data
Sep. 6, 2018 (DE) .......................... 102018121754.4

(51) Int. Cl.
*H04B 10/00* (2013.01)
*G01S 7/481* (2006.01)
*G01S 17/89* (2020.01)

(52) U.S. Cl.
CPC .......... *G01S 7/4812* (2013.01); *G01S 7/4817* (2013.01); *G01S 17/89* (2013.01)

(58) Field of Classification Search
CPC ... H04B 10/11; H04B 10/112; H04B 10/1123; H04B 10/114; H04B 10/1143; H04B 10/1149; H04B 10/40; H04B 10/116; G01S 7/4817; G01S 7/4812; G01S 17/42; G01S 17/89; G01S 17/48; G01S 17/10; G01S 7/4814; G02B 26/10; G02B 26/0816
USPC ....... 398/169, 170, 118, 119, 127, 128, 129, 398/130, 131, 135, 136, 158, 159, 172; 356/4.01, 5.01, 3.01, 4.1
See application file for complete search history.

(56) References Cited

U.S. PATENT DOCUMENTS

| 8,836,922 | B1 * | 9/2014 | Pennecot | ................ G01S 17/42 356/9 |
|---|---|---|---|---|
| 2017/0131404 | A1 * | 5/2017 | Ohtomo | ................. G01S 17/48 |
| 2017/0350983 | A1 * | 12/2017 | Hall | ....................... G01S 17/10 |
| 2018/0074519 | A1 | 3/2018 | Qin et al. | |

* cited by examiner

*Primary Examiner* — Hanh Phan

(57) ABSTRACT

A LIDAR system for ranging an object using primary and secondary light reflected at the object, includes a laser, arranged to emit the primary light along a transmit beam towards a scanning element of the system, wherein at least a part of the transmit beam adjacent to the scanning element defines a center line, a detector, arranged to detect the secondary light along a receive beam, wherein the receive beam includes a first part aligned with the center line and a second part having an inclination with respect to the center line, wherein the second part of the receive beam is in-between the first part and the detector, and a segmented lens, positioned on the center line in-between the first part of the receive beam and the second part of the receive beam, wherein the receive lens segment is designed to focus the receive beam onto the detector.

20 Claims, 12 Drawing Sheets

COAXIAL SETUP FOR LIGHT DETECTION AND RANGING, LIDAR, MEASUREMENTS

CROSS-REFERENCE TO RELATED APPLICATION

This application is the National Stage of, and therefore claims the benefit of, International Application No. PCT/EP2019/073602 filed on Sep. 4, 2019, entitled "COAXIAL SETUP FOR LIGHT DETECTION AND RANGING, LIDAR MEASUREMENTS," which was published in English under International Publication Number WO 2020/049055 on Mar. 12, 2020, and has a priority date of Sep. 6, 2018, based on application DE 10 2018 121 754.4. Both of the above applications are commonly assigned with this National Stage application and are incorporated herein by reference in their entirety.

TECHNICAL FIELD

Various examples generally relate to light detection and ranging, LIDAR. Various examples specifically relate to an off-axis coaxial setup for LIDAR.

BACKGROUND

Light detection and ranging (LIDAR; sometimes also referred to as laser ranging or LADAR) allows to provide a 3-D point cloud of a scene. Objects can be accurately detected. Ranging is possible. Pulsed or continuous-wave laser light is transmitted along a transmit beam and, after reflection at an object, detected along a receive beam. This allows to determine the distance to the object (z-position).

Primary light used to probe the object originates from a light source and secondary light reflected at the object is guided to a detector. A so-called coaxial setup uses a transmit beam for the primary light and a receive beam for the secondary light that are coaxially aligned. Typically, this means that the same scanning element is arranged in the transmit beam and the receive beam. While a coaxial setup has advantages like device compactness, the complexity of the optical system is increased. This increased complexity can also lead to a larger complexity of the components like laser system, detector and optics, thereby increasing unit costs and leading to an increase in device volume.

From US 2010180722A1, a scanning LIDAR system with a lens assembly and an electro-optic assembly is known. The lens assembly may be translated to a plurality of first positions, the electro-optic assembly may be translated to a plurality of second positions. From data obtained by the scanning LIDAR system a three-dimensional image of one or more objects may be determined based on a determined time of flight.

SUMMARY

There is a need exists for improved coaxial setups for LIDAR systems. A need exists for techniques which overcome or mitigate at least some of the above-identified restrictions and drawbacks.

This need is met by the features of the independent claims. The features of the dependent claims define examples.

A LIDAR system for ranging an object using primary light and secondary light reflected at the object includes: A laser, arranged to emit the primary light along a transmit beam towards a scanning element of the LIDAR system, wherein at least a part of the transmit beam adjacent to the scanning element defines a center line. The LIDAR system further includes a detector, arranged to detect the secondary light along a receive beam. The receive beam includes a first part aligned with the center line and a second part having an inclination with respect to the center line. The second part of the receive beam is in-between the first part of the receive beam and the detector. The LIDAR system also includes a segmented lens, positioned on the center line in-between the first part of the receive beam and the second part of the receive beam. The segmented lens includes a transmit lens segment associated with the transmit beam and a receive lens segment associated with the receive beam. The receive lens segment is arranged to focus the receive beam onto the detector.

A part of the transmit beam adjacent to the scanning element may be a part of the transmit beam in-between the scanning element and the laser.

A LIDAR system for ranging an object using primary light and secondary light reflected at the object includes: A laser, arranged to emit the primary light along a transmit beam towards a scanning element of the LIDAR system, wherein at least a part of the transmit beam adjacent to the scanning element defines a center line. The LIDAR system further includes a detector, arranged to detect the secondary light along a receive beam. The transmit beam includes a first part aligned with the center line and a second part having an inclination with respect to the center line. The second part of the transmit beam is in-between the first part of the transmit beam and the laser. The LIDAR system also includes a segmented lens, positioned on the center line in-between the first part of the transmit beam and the second part of the transmit beam. The segmented lens includes a transmit lens segment associated with the transmit beam and a receive lens segment associated with the receive beam. The receive lens segment is arranged to focus the receive beam onto the detector.

A LIDAR system for ranging an object using primary light and secondary light reflected at the object includes: A laser, arranged to emit the primary light along a transmit beam towards a scanning element of the LIDAR system. The LIDAR system further includes a detector, arranged to detect the secondary light along a receive beam. The laser has a first substrate extending in a first plane. The detector has a second substrate extending in a second plane, wherein the first plane and the second plane are parallel to each other.

Various examples described above can also be combined to form further examples. For example, it would be possible that, both, the transmit beam, as well as the receive beam have an inclination with respect to the center line.

DETAILED DESCRIPTION OF EXAMPLES

Figure 1A:
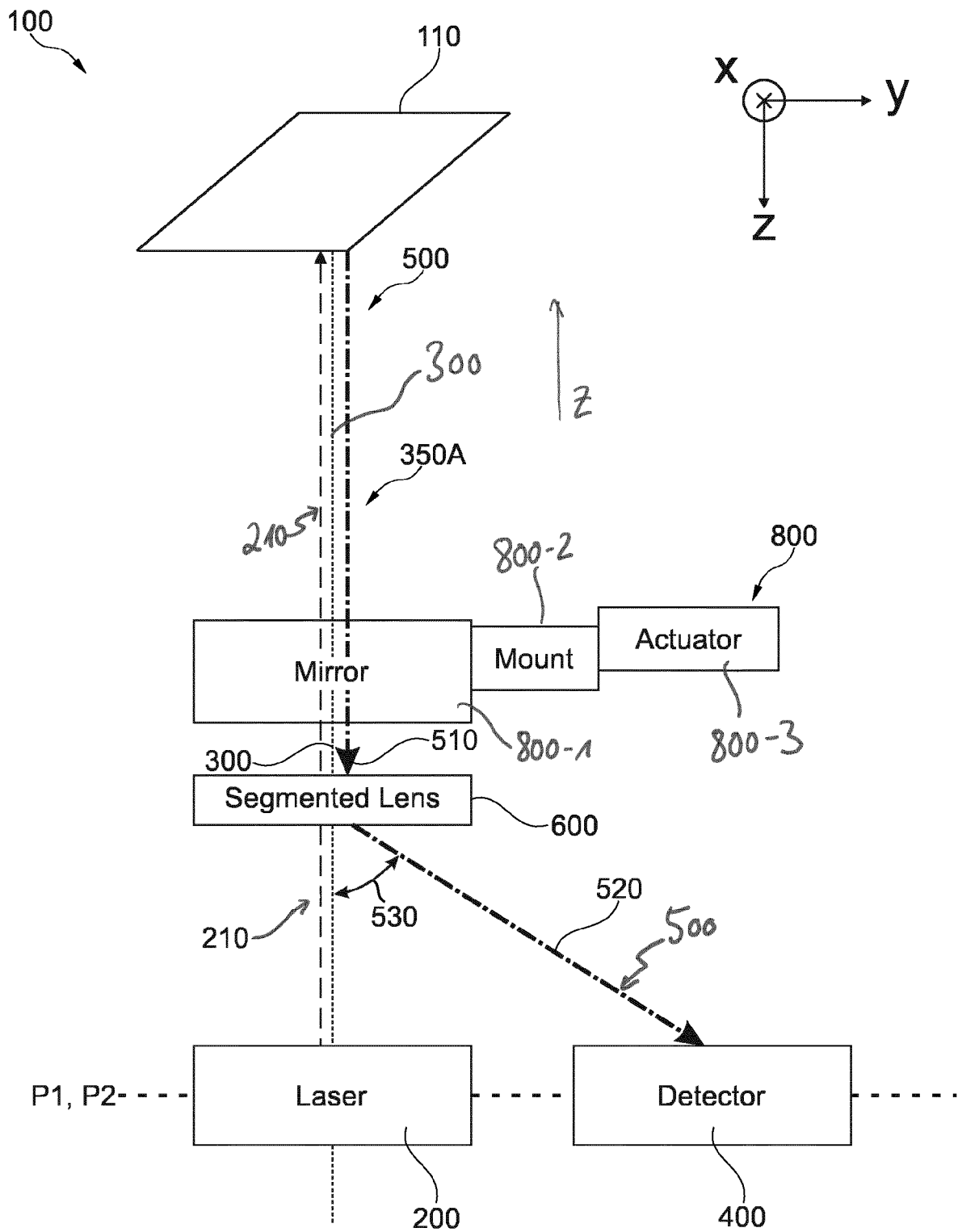
FIG. 1A schematically illustrates a LIDAR system including a coaxial setup of an optical system with an off-axis component according to various examples.

In the following, examples will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques for LIDAR are described. Specifically, techniques are described which facilitate building a compact and robust LIDAR system that uses a coaxial setup of a transmit beam and a receive beam of a respective optical system. LIDAR is used for ranging a distance to an object. For example, pulsed LIDAR may be used, or continuous-wave LIDAR may be used.

According to various examples, a LIDAR system includes a segmented lens. The segmented lens includes multiple segments, e.g., a transmit lens segment and a receive lens segment. The transmit lens segment is associated with the transmit beam and the receive lens segment is associated with the receive beam. For example, the receive lens segment may implement a focal lens element to focus the receive beam onto the detector. For example, the transmit lens segment may implement a collimator lens element to collimate at least one axis of the transmit beam.

Within the present disclosure, a lens element of a lens of the optical system is generally defined by the respective optical properties, for example the focal length and the optical axis. These may correlate with the geometric shape of a surface of the respective lens element. Examples include a cylindrical lens element and a bifocal lens element. A lens may include multiple lens elements. Different lens elements are formed by different lens segments of such a segmented lens. Different lens segments can in turn be associated with different beams (i.e., act upon different beams), e.g., the transmit beam and the receive beam. According to various examples, a segmented lens includes a transmit lens segment associated with the transmit beam and a receive lens segment associated with the receive beam.

In the following, first, various examples detailing possible structure of the segmented lens will be described. Then, various examples regarding a lens actuator, which may be used to move the segmented lens, will be described. It should be appreciated that the features discussed in these sections may be combined. For example, the various examples described in the following section regarding the segmented lens may be actuated as described in the subsequent section by various examples of the lens actuator. Further, it should be appreciated that the segmented lens and the lens actuator can be applied to a coaxial optical setup.

Examples of the Segmented Lens

According to various examples described herein, at least one surface of the lens element of the receive lens segment does not possess rotational symmetry with respect to a center line. The receive beam can thereby be focused off-axis from a center line (off-axis detection, hereinafter). The center line may, e.g., be defined by the transmit beam, e.g., by a central axis of the transmit beam past the lens, i.e., towards the object. Alternatively or additionally, the center line may be defined with respect to the receive beam, e.g., upstream of the lens, i.e., towards the object. The center line may be defined with respect to an aperture of the optical system, e.g., a common aperture for the transmit beam and the receive beam. The aperture may be formed by a mirror for steering the transmit beam (steering mirror). Hence, generally, the center line may be defined with respect to the transmit beam and/or the receive beam adjacent to a scanning element including the steering mirror. The center line may be laterally located at or close to a geometrical center of an overall lens body of the segmented lens. In some examples, the center line may coincide with the optical axis of the transmit beam adjacent to the scanning element, i.e. may be located at the center of the lateral light field distribution of the primary light travelling along the transmit beam. The center line may be generally aligned with a z-axis of a coordinate system of the LIDAR system.

The steering mirror, or more generally, the scanning element can be actuated by an actuator element, e.g., a piezoelectric drive, a magnetic drive, or an electrostatic drive.

At least one surface of the lens element of the transmit lens segment may possess rotation symmetry, e.g., a 180° rotational symmetry.

By means of such off-axis detection in which at least one surface of the lens element of the receive lens segment of the segmented lens does not possess rotational symmetry with respect to the center line, it is possible to separate the transmit beam and the receive beam; specifically, an inclination of a part of the receive beam between the detector and the segmented lens and with respect to the center line can be achieved. In other scenarios, it would be possible to implement an inclination of a part of the transmit beam between the laser and the segmented lens, e.g., by making the transmit lens segment such that it does not possess rotational symmetry with respect to the center line. Hence, off-axis detection may be combined with or replaced by off-axis transmission.

Such of off-axis detection and/or off-axis transmission may have the effect of simplifying the mechanical setup of components and/or the manufacturing process required as well as size of the device. A beam splitter, to separate the transmit beam and the receive beam, may not be required. The detector and the laser can be placed offset from each other, due to the inclination.

In some examples, the transmit lens segment is designed to at least partly collimate a slow axis of the transmit beam.

In some examples, the primary light may have a fast axis, FA, and a slow axis, SA, the fast axis having a larger divergence than the slow axis next to the laser. Typically, an active region (emitter region forming a laser resonator) of the laser is different from the FA and the SA. I.e., the active region can have two sides of different length. The long side of the active region can correspond to the SA, and the small side of the active region can correspond to the FA.

A slow-axis field width of the primary light along the slow axis may not be smaller than 90% of a respective width of the steering mirror perpendicular to the transmit beam, at the steering mirror.

The FA and the SA may be oriented perpendicular to the transmit beam.

By collimating the SA of the transmit beam using the transmit lens segment, the slow axis collimation may be spaced further apart from the light source, leading to increased quality of the collimation.

In some examples, the LIDAR system further includes a further lens positioned in-between the laser and the segmented lens and arranged to expand at least the SA of the transmit beam. Thus, in other words, a two-step collimation can be implemented, by means of the further lens and the transmit lens segment of the segmented lens.

This may have the advantage that the tolerance requirements each of the transmit lens segment and the further lens are reduced and/or distortions, for example aberrations, may be compensated by using two optical elements, possibly leading to reduced overall costs of the system. Alternatively or additionally, this may have the advantage that the further lens and the transmit lens segment of the segmented lens may act together as a Galilean telescope or a Keplerian telescope, which may allow a more compact optical setup for primary light collimation, while maintaining the collimation quality of the primary light, for example the collimation quality of the primary light of the transmit beam adjacent to the scanning element.

In some examples, the transmit lens segment and the receive lens segment of the segmented lens are integrally formed.

This may have the advantage that a high optical quality and a well aligned geometrical relationship between the optical surfaces of the transmit lens segment and the receive lens segment may be achieved.

In alternative examples, the transmit lens segment may be surrounded or embedded into the receive lens segment.

This may have the advantage that each segment many be manufactured and selected independently, which can lead to a reduction in costs.

In some of these examples, a material of the transmit lens segment and the receive lens segment may have a different index of refraction. This can have the advantage that the optical properties of each segment can be chosen independently. However, it should be noted that this is also possible in cases where the transmit lens segment and the receive lens segment of the segmented lens are integrally formed, by glass manufacturing techniques known in the art, for example in the field of multi-focal lenses for vision correction.

In some examples, the transmit lens segment is a cylindrical lens element or a bifocal lens element. A cylindrical lens may generally have the shape of a cylinder.

In some examples, the segmented lens includes a flat surface oriented perpendicular to the center line.

This may have the advantage that the cost of manufacture for the segmented lens may be reduced. It may also have the advantage that mechanical alignment of the segmented lens may be simplified, and the alignment may be more robust, especially in working environments with vibrations, e.g. mobile applications like automotive or robotics.

In some examples, the segmented lens includes a first surface forming the transmit lens segment and a second surface forming the receive lens segment, wherein the first surface and the second surface are connected via continuous transitions. Continuous transitions can be distinguished from stepwise transitions where abrupt changes of the thickness of the lens body parallel to the center line are observed.

This may have the advantage that manufacturing can be simplified and/or stray light due to reflections at discontinuous surfaces may be reduced or even avoided.

In some examples, the receive lens segment includes a first lens element and a second lens element, wherein the first lens element and the second lens element have different geometrical lens parameters. By implementing different geometrical lens parameters, aberrations can be reduced.

The transmit lens segment may include a lens element which may be positioned in-between the first lens element of the receive lens segment and the second lens element of the receive lens segment.

In some examples, the laser has a first substrate extending in a first plane and wherein the detector has a second substrate extending in a second plane, wherein the first plane and the second plane are parallel to each other.

This may have the advantage that the geometry of the optical setup is improved. Also, the cost of manufacture may be reduced as it can be possible in some examples to manufacture, populate and/or install both substrates from a single direction.

In some examples, the first plane and the second plane coincide.

This may have the advantage that the manufacturing, installation, and/or population process may be further simplified.

In some examples, the laser is an edge-emitter laser diode configured to emit the primary light in parallel to the first plane. The edge-emitter laser diode is integrated on a substrate; here, the light can be emitted along an edge perpendicular to the substrate that is obtained from braking or cutting the substrate.

In some examples, the LIDAR system further includes a mirror located in the second plane adjacent to the laser and arranged to deflect the primary light towards the center line.

This may have the advantage that a compact design is enabled. In addition, stray light may be reduced.

In some examples, the laser and the detector are provided on a single circuit board. This may further reduce the manufacturing cost of the LIDAR device.

In some examples, the center line forms an optical axis of the transmit beam and the receive beam adjacent to the scanning element, i.e., is arranged at a center of the lateral light field distribution of the secondary light travelling along the receive beam.

This may have the advantage that the scanning element can be used to deflect both the transmit beam, as well as the receive beam.

In some examples, the segmented lens is manufactured by mold injection. This may have the advantage that the cost of manufacture of the segmented lens may be reduced and/or complex shapes for the segmented lens may be used.

In the following, various examples regarding a lens actuator which may be used to move the segmented lens will be described. In some examples, the segmented lens actuated as described herein may be chosen from the various examples described before and in the following. In other examples, the actuation methods and devices described herein may be applied to segmented lenses different from the segmented lenses described herein. In further examples, instead of a segmented lens, a non-segmented lens, for example a collection of lenses, a free-form lens or one or more ordinary lenses, e.g., chosen from commercially available stock lenses, may be used instead of the segmented lens. In other words, it should be appreciated that the techniques disclosed regarding actuation of the segmented lens may also be applied to other optical objects or systems in general, for example focusing or non-focusing mirrors, diffractive elements, etc.

The actuator may comprise further elements, for example a mount and an actuator element. In such examples, the actuator element may provide motion and the mount may connect at least a moving part of the actuator element with the segmented lens. The actuator element may comprise one or more piezo actuators. The actuator element may have a 1-D translational degree of freedom. The mount may include a ball bearing or the like.

Examples Regarding Actuation of the Segmented Lens

In some examples the LIDAR system comprises a lens actuator configured to move the segmented lens.

Moving the segmented lens provides at least one (additional—i.e., beyond degree of freedom provided by a scanning element) to direct the primary light and/or the secondary light. In examples with a coaxial setup, the actuation can have the effect that the actuation influences the transmit beam and the receive beam in the respective parts of the beams between the optical element and the object, while essentially not moving the respective parts of the beams on the other side of the optical element, i.e. in between the laser/detector and the optical element. This is sometimes referred to as an optically conjugate configuration.

In some examples, the detector is arranged with a distance along a second axis perpendicular to the center line and with respect to the laser; to thereby define the inclination of the second part of the receive beam. Further, the lens actuator may be configured to provide the movement of the segmented lens along a third axis. The third axis may be essentially perpendicular to both the center line and the second axis.

The second axis is hereinafter defined as the y-axis; and the third axis is hereinafter defined as the x-axis. The center line defines the z-axis.

As a general rule: A given axis is essentially perpendicular to a further given axis if the angle enclosed between the given axis and the further given axis is $90°\mp-20°$, optionally $90°\mp-15°$, optionally $90°\mp-10°$, optionally $90°\mp-5°$, optionally $90°\mp-2°$, optionally $90°\mp-1°$.

In some examples, the LIDAR system comprises a further actuator of the scanning element. The further actuator may include an actuator element that may be configured to act upon a mount of one or more steering mirrors of the scanning element to provide a deflection to the one or more steering mirrors. The actuator element of the further actuator may comprise one or more piezo actuators or specifically bending piezo actuators. The actuator element of the further actuator may have a 1-D translational degree of freedom.

A frequency of operation of movement of the lens provided by the lens actuator may be smaller than a frequency of operation of the deflection of the one or more steering mirrors provided by the further actuator. In some examples, a frequency of operation of the movement is not larger than 50% if compared to a frequency of operation of the deflection. In some examples, a frequency of operation of the movement is not larger than 5% if compared to a frequency of operation of the deflection.

The lens actuator may be configured to provide the movement of the segmented lens non-resonantly.

This may have the advantage that the mass of the segmented lens may have a limited impact on the actuation of the segmented lens.

However, in other examples, the lens actuator may be configured to provide the movement of the segmented lens resonantly. This may be achieved for example by spring elements—e.g., flexure or torsion spring elements—attached to the segmented lens and excited by the actuator, for example directly or indirectly excited, to provide a suited resonance frequency for operation.

The further actuator may be configured to provide the deflection of the one or more steering mirrors resonantly, i.e., at or close to an eigenfrequency of a mass-spring system formed by the one or more steering mirrors and their mount(s).

This may have the advantage that a high frequency of the deflection of the steering mirrors may be achieved. Resonant deflection may have the advantage that the deflection may be carried out with increased energy-efficiency compared to non-resonance deflection.

A mass of the mount and the one or more steering mirrors may be less than a mass of the segmented lens. For example, the mass of the mount and the one or more steering mirrors (mass-spring system) may be for example not be larger than 1%, for example 20%, for example 60% of the mass of the segmented lens.

In some examples, at least a second part of the transmit beam in-between the scanning element and the object defines a transmit-and-receive direction; also, the receive beam is associated with the transmit-and-receive direction. The transmit-and-receive direction may define the second part of the receive beam.

The transmit-and-receive direction may be defined as the direction in which the primary light is guided by the LIDAR system after leaving the last optical surface of the scanning element. The last optical surface in this respect is typically the last optically active surface the primary light interacts with before exiting the LIDAR systems aperture, unless there is a post-scanner optics provided.

As a general rule, the transmit-and-receive direction moves within the coordinate system defined by the x-axis, y-axis, and z-axis, as a function of time. As actuators or scanning elements are moving and operating, the transmit-and-receive direction may change as a function of time.

The orientation of the scan- and receive direction may be defined by (i) deflection of the scanning element upon actuation by the further actuator, and (ii) movement of the segmented lens upon actuation by the lens actuator.

In such examples, the actuation of the segmented lens may provide at least one further degree of freedom for the transmit-and-receive direction. In other words, by using the lens actuator, the effect of the scanning element on the transmit-and-receive direction may be opposed or amplified. Thus, the movement of the transmit-and-receive direction may be a superposition of the movement provided by, firstly, the actuation of the scanning element to deflect the scanning element and, secondly, the lens actuation of the segmented lens to move the segmented lens.

Such superposition may be used for shock compensation, for example in a closed-loop control setup.

In some examples such superposition may be used to increase the amplitude of the actuation provided by an actuation element of the scanning element and/or the lens actuation.

In some examples, a first translational degree of freedom of the lens actuator has an orthogonal component to a second translational degree of freedom of the further actuator.

In some examples, the first translational degree of freedom of the lens actuator is orthogonal to the second translational degree of freedom of the further actuator.

For instance, an actuator element of the actuator of the scanning element may be limited in terms of the actuation amplitude or the degree of freedom that can be actuated (sometimes referred to as under-actuated system). For instance, the actuation element may only be able to actuate movement of the scanning element along X-axis, but not along Y-axis. Then, such under-actuation may be compensated by the actuation of the segmented lens. In such and other examples, the actuation direction of the lens actuator may be aligned with or offset from an operation direction of the actuator element of the further actuator of the scanning element, the actuation direction of the lens actuator may be essentially perpendicular to the operation direction of the actuator element of the further actuator of the scanning element. For example, the actuation direction of the lens actuator may be at least partially aligned or offset from a piezo bending orientation of the actuator element.

As an example, the lens actuator for the segmented lens and the further actuator for the mass-spring system formed by the one or more mirrors and the mount of the scanning element each have a 1-D translational degree of freedom. In this example, the first translational degree of freedom of the lens actuator is orthogonal to the second translational degree of freedom of the further actuator. In this case, if for example a mechanical shock event occurs at the system perpendicular to the second translational degree of freedom of the further actuator, the further actuator may not be able to compensate this shock. However, at least partial compensation of the mechanical shock event may be possible by the lens actuator as the first translational degree of freedom of the lens actuator is orthogonal to the second translational degree of freedom of the further actuator.

The reasoning of this example applies to other examples as well, where the first translational degree of freedom of the lens actuator has an orthogonal component to the second translational degree of freedom of the further actuator.

Also, a slow actuator may be used for a fine alignment of the LIDAR system, for example after installation to a device, for example a car.

In some examples, the LIDAR system has two degrees of freedom to steer the beam, for example a first angle and a second angle. In some examples, one degree of freedom, for example the first angle, is provided by the scanning element and the remaining degree of freedom, for example the second angle, is provided by the lens actuator. This may have the benefit that the scanning element may be simplified compared to scanning elements which are configured to provide two degrees of freedom.

In some examples, a scanning element providing two degrees of freedom may comprise two actuated mirrors, a scanning element providing one degree of freedom may comprise one actuated mirror or only have one actuated mirror. In those examples, a scanning element which provides one degree of freedom may be cheaper to manufacture than a scanning element which provides two degrees of freedom.

In some examples, a projection plane is defined by the x-axis and the center line. A first projected length of an effective focal length of the transmit lens segment into the projection plane, and a second projected length of an effective focal length of the receive lens segment projected in the projection plane may be essentially identical.

A first length $l_1$ and a second length $l_2$, wherein $l_2 \geq l_1$ holds, are essentially identical if for example $l_1/l_2 \geq 0.8$, for example $l_1/l_2 \geq 0.99$ holds.

The effective focal length of the transmit lens segment may be the focal length of the transmit lens segment taken by itself. In other examples the effective focal length of the transmit lens segment may be considered for only on axis of the primary beam profile, for example a fast axis and/or a slow axis. In further examples or in examples combined with the previous examples, the effective focal length of the transmit lens segment may be defined as the focal length of the transmit lens segment combined with further optical elements, for example further lenses in-between the transmit lens segment and the laser. In such examples with additional optical elements the focal length may also be different in the slow axis.

This may have the effect, that the focal lengths of the transmit lens segment and of the receive lens segment are essentially identical in this projection plane. This may have the effect that in a coaxial setup, as lens is moved, the focus of the optical system may remain aligned on the detector.

For example, if the lens is only actuated along the slow axis, the focal length may only be essentially identical with respect to the slow axis. Thus, an optically conjugate configuration may be achieved. In some examples, a change of position of a focus point of the receive lens segment during movement along the fast axis may be tolerated.

FIG. 1A schematically illustrates a LIDAR system including a coaxial setup employing off-axis detection according to various examples.

The LIDAR system 100 may be used for ranging an object 110 using primary light and secondary light reflected at the object 110.

Laser light, e.g., pulsed laser light or cw laser light may be used.

In the example of FIG. 1A, a coordinate system x, y, and z is defined with z in the direction of propagation of the secondary light.

The LIDAR system 100 includes a laser 200, arranged to emit the primary light along a transmit beam 210 towards a scanning element 800 of the LIDAR system. The scanning element 800 may include one or more mirrors 800-1 to steer the transmit beam. An actuator 800-3 may act upon a mount 800-2 of the one or more steering mirrors 800-1 to deflect the steering mirrors. In other examples, the one or more steering mirrors may directly be attached to the actuator. The mount could be an elastic mount comprising one or more spring elements. The one or more spring elements may be elastically deformed. For instance, the actuator may operate a mass-spring system formed by the mount and the one or more steering mirrors at or close to an eigenfrequency, e.g., corresponding to flexure or torsion of the one or more spring elements.

The LIDAR system 100 further includes a detector 400, arranged to detect the secondary light along a receive beam 500. For example, a single photon avalanche detector array may be used as the detector 400.

In a coaxial setup as shown in the example of FIG. 1A, the direction of the receive beam 500 between the object 110 and the mirror of the scanning element 800 as well as the direction of the transmit beam 210 between the mirror of the scanning element 800 and the object 110 may be described as a transmit-and-receive direction 350A. In the example of FIG. 1A, the transmit-and-receive direction 350A is aligned with the z-axis of the coordinate system. The coordinate system, including the z-axis, is generally static, while the transmit-and-receive direction can move as a function of time. Thereby, scanning LIDAR is implemented.

In the example of FIG. 1A, the laser is located on a first plane P1 and the detector is located on a second plane P2, wherein in the example of FIG. 1A P1 and P2 coincide. As a general rule, the first plane P1 and the second plane P2 may be parallel to each other but can be offset from each other.

In the example of FIG. 1A, the receive beam includes a first part 510 and a second part 520, wherein the second part 520 of the receive beam 500 is in-between the first part 510 of the receive beam 500 and the detector 400. The second part 520 has an inclination 530 with respect to the first part 510 and with respect to the center line 300.

The LIDAR system 100 further includes a segmented lens 600. The segmented lens 600 is positioned in-between the parts 510, 520 of the receive beam 500. The segmented lens 600 acts as a beam splitter. The segmented lens 600 focuses the receive beam 500 onto the detector 400. This is achieved by inclining the second part 520 of the receive beam 500 with respect to the center line 300.

Details with respect to the segmented lens 600 will be described below with reference to FIG. 2A, FIG. 3A-3c, and FIG. 4A-c.

The segmented lens 600 is positioned on the center line 300 in-between the first part of the receive beam 510 and the second part 520 of the receive beam. The segmented lens 600 includes a transmit lens segment 610 associated with the transmit beam and a receive lens segment 620 associated with the receive beam. In these examples, the transmit lens segment 610 implements a lens element 611 that is arranged to collimate the SA of the transmit beam 210; and the receive lens segment implements lens elements 621, 622 that are designed to focus the receive beam onto the detector 400 as indicated in FIG. 1A.

Figure 1B:
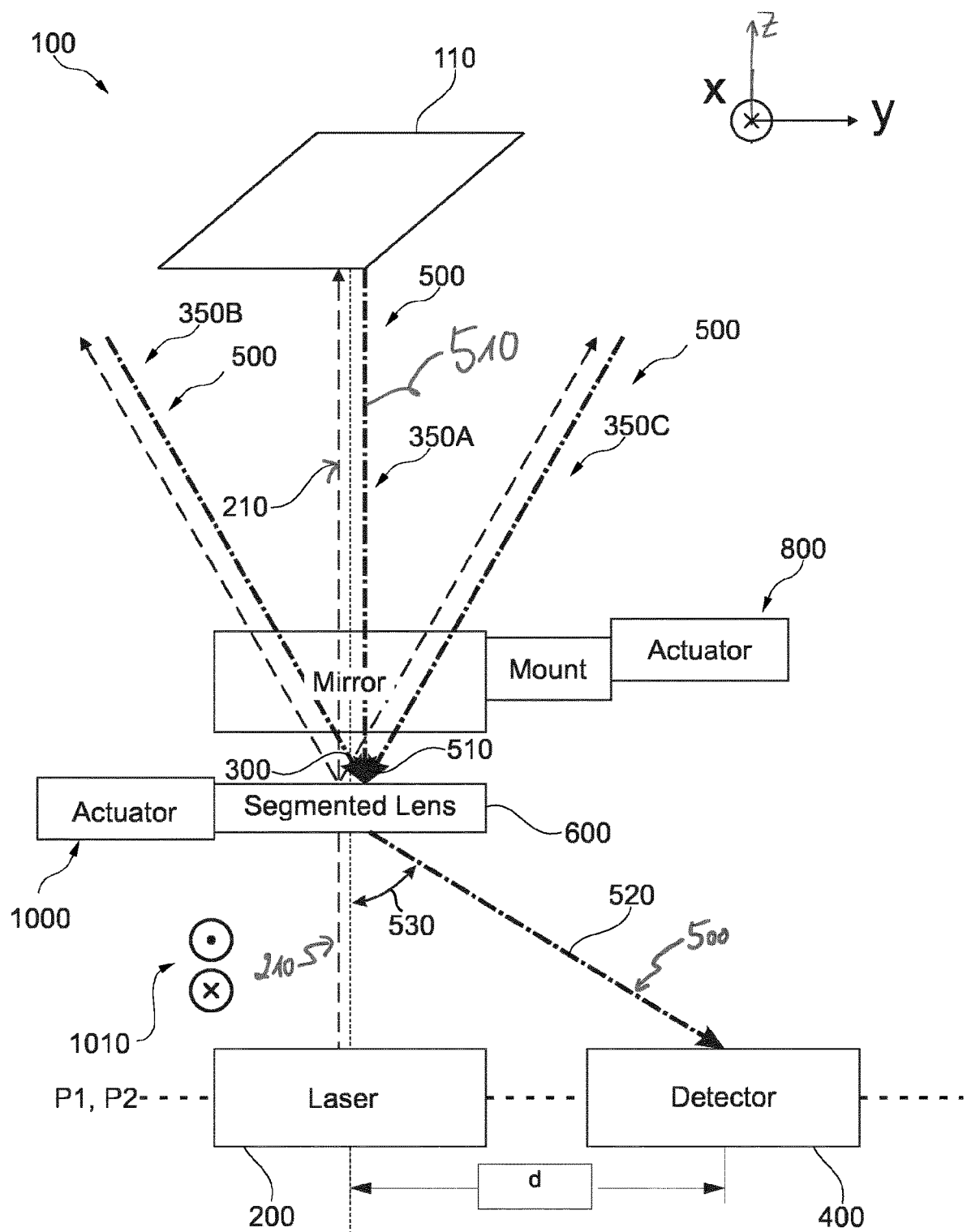
FIG. 1B shows a modified example of the LIDAR system of FIG. 1A which further comprises a lens actuator.

FIG. 1B shows a modified example of the LIDAR system of FIG. 1A, with a lens actuator 1000. The lens actuator 1000 is optional.

The LIDAR system 100 may be the LIDAR system 100 of FIG. 1A, which additionally comprises the lens actuator 1000. The lens actuator 1000 may be configured to move the segmented lens 600. Movement of the segmented lens 600 may be provided as lateral translation in one, two, or three directions. In addition or alternatively, rotation of the segmented lens may be provided by the lens actuator 1000.

Scanning of the LIDAR system 100 may thus be achieved by different methods. Scanning may be achieved by actuation of the scanning element 800 alone, by actuation of the lens actuator 1000 alone, or by combined actuation of lens actuator 1000 and scanning element 800.

Scanning may have the effect that the transmit-and-receive direction may be modified as a function of time. In the example of FIG. 1B, three different transmit-and-receive directions 350A, 350B, 350C are shown schematically for illustrative purposes. For example, at a first point in time the LIDAR system may define the transmit-and-receive direction 350A, at a second point in time the LIDAR system may define the transmit-and-receive direction 350B, and at a third point in time the LIDAR system may define the transmit-and-receive direction 350C.

In some examples, the LIDAR system 100 may be designed so that the scanning leaves the transmit beam 210 and the receive beam 500 (i.e., the second part 520 of the receive beam) essentially unchanged in the respective sections between the segmented lens 600 and the laser/detector.

Figure 2A:
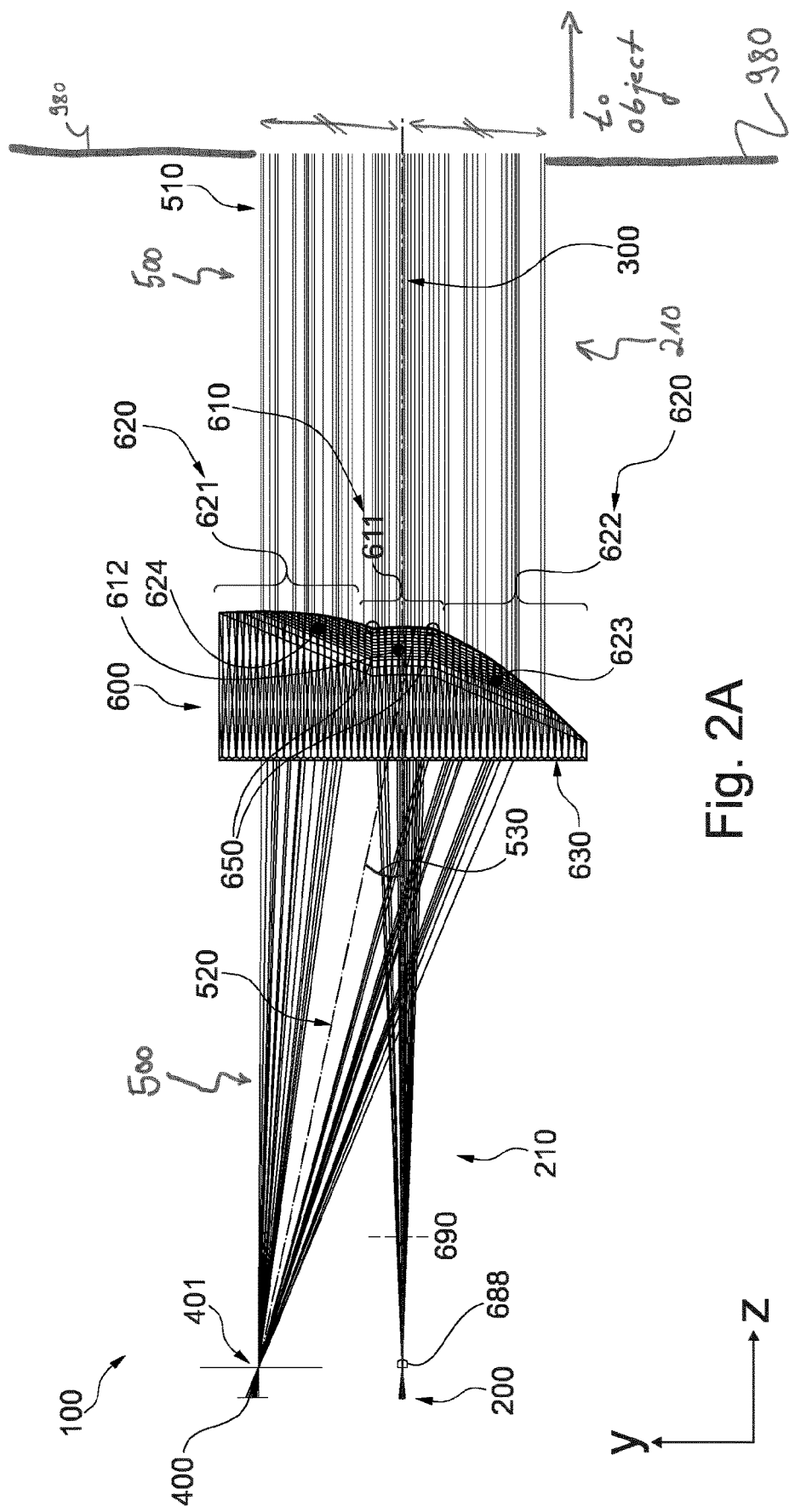
FIG. 2A schematically illustrates an example implementation of the coaxial setup with the off-axis component according to various examples.

FIG. 2A schematically illustrates an example implementation of the coaxial setup employing off-axis detection according to various examples.

FIG. 2A is a schematic side view indicating ray-traced optical rays of primary light emitted from a laser 200 and secondary light reflected by the object 110. In the example of FIG. 2A, the transmit beam 210 is collimated in a fast axis by a lens 688 implementing an FA collimator and by a lens element 611 of the transmit lens segment 610 of the segmented lens 600 forming a SA collimator. In the example of FIG. 2A, the center line 300 of the optical setup coincides with the transmit beam 210.

In some examples, the collimation of FA and/or SA is additionally performed using an optional further lens 690. This may ease the optical requirements on the collimating lenses and thus reduce the costs of the device.

The laser emits primary light which interacts with an object (not shown) and part of the primary light travels along the receive beam 500 including the first part 510 and the second part 520. The first part 510 of the receive beam 500 impinges on the segmented lens 600. The first part 510 of the receive beam 500 is aligned with the transmit beam (coaxial setup), in particular in an antiparallel alignment.

The coaxial setup is illustrated in FIG. 2A: both, the transmit beam 210, as well as the receive beam 500 pass a common aperture 980, e.g., implemented by one or more mirrors 800-1 of the scanning element 800. The center line 300 is arranged at the center of the aperture 980.

The lens element 611 of the segmented lens 600 includes a first surface 612 forming the transmit lens segment 610; the lens elements 621, 622 include second surfaces 623, 624 forming the receive lens segment 620. The lens elements 621, 622 focus the receive beam onto a pinhole 401 of the detector 400. As indicated by the dashed-dotted line, the second part 520 of the receive beam 500 has an inclination 530 with respect to the center line 300.

The lens element 611 of the transmit lens segment 610 can be a bifocal lens element or a cylindrical lens element.

In the illustrated example, the first surface 612 and the second surfaces 623, 624 are connected via continuous transitions 650: there are no steps or offsets or facets in parallel to the center line 300 at the boundaries between the first surface 612 and the second surfaces 623, 624. This may help to avoid stray light from the laser to enter the detector and may simplify manufacturing of the lens.

In the example of FIG. 2A, the inclination 530 of the second part 520 of the receive beam 500 is achieved by the second surfaces 624, 623 not possessing rotational symmetry with respect to the center line 300. Also, the second surface 624 and the second surface 623 have different geometrical lens parameters: thereby, aberrations due to the asymmetric design can be avoided.

The back-surface of segmented lens 600 is a flat surface 630, thereby easing alignment and making the system more robust against vibrations.

Figure 2B:
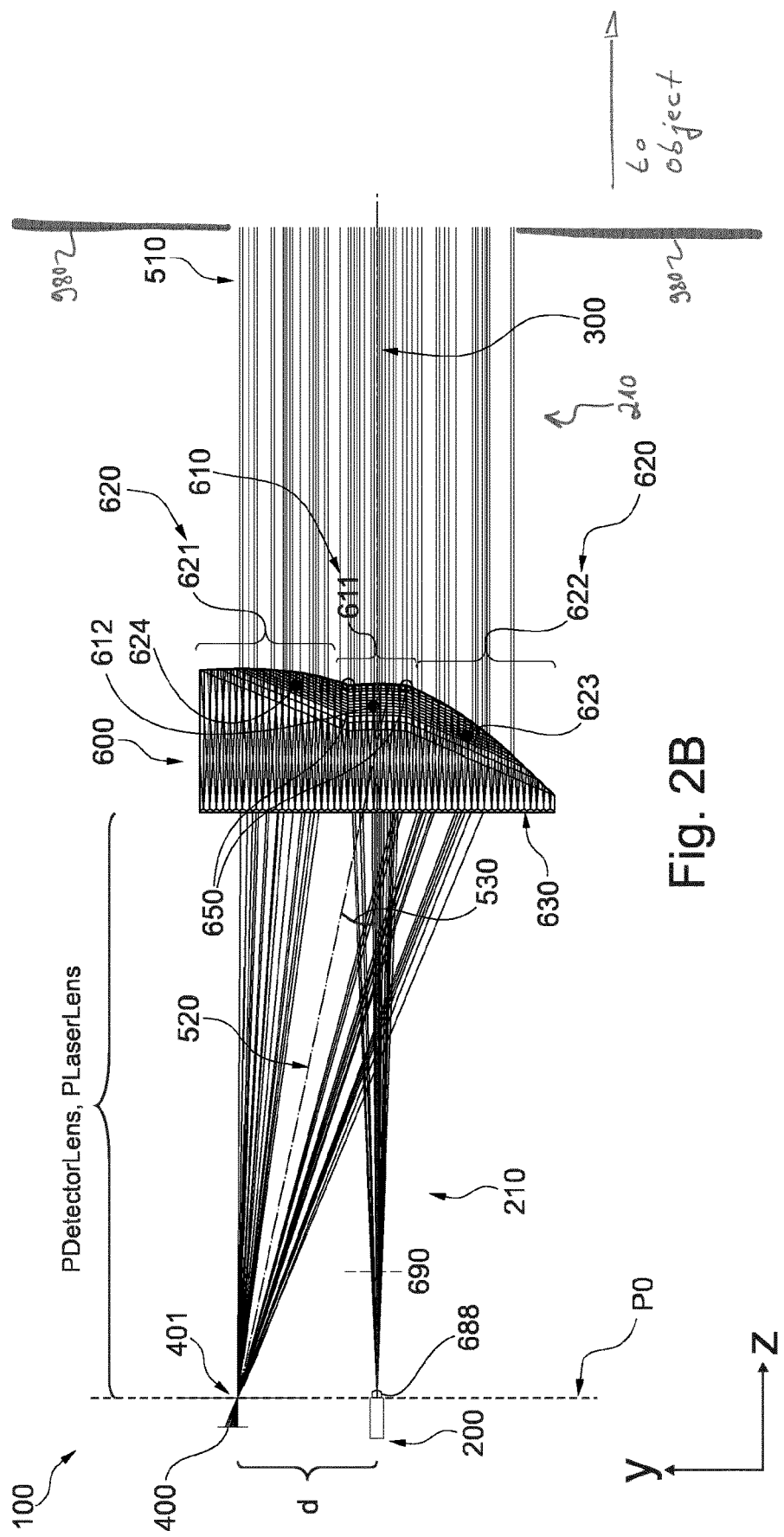
FIG. 2B shows a modified example of the example shown in FIG. 2A.

FIG. 2B shows a modified example of the example shown in FIG. 2A.

Possible examples will be described with view to FIG. 1B and FIG. 2B.

In some examples, the detector 400 is placed off-axis with respect to the center line 300. In the examples according to FIG. 1B and FIG. 2B, the detector 400 is offset by a distance d in the y-direction. In other examples, the offset may be along a different axis or a combination of axes, for example in the x-direction or in a direction along both x- and y-direction.

The detector 400 may be arranged with a distance d along the y-axis perpendicular to the center line 300 with respect to the laser 400 to define the inclination 530 of the receive beam, In other words, both the laser and the detector may be located on a plane P1 perpendicular to the center line.

In some examples, as shown in FIG. 1B, the lens actuator 100 is configured to move the segmented lens 600 along an actuation direction 1010 which is essentially perpendicular to both the center line 300 and the y-axis; i.e., the actuation direction 1010 is aligned with the x-axis. This will be further illustrated with reference to figures FIG. 6A, FIG. 6B, and FIG. 6C below.

In some examples, a projection plane may be defined by the x-axis and the center line 300. In the examples of FIGS. 1B and 2B the projection plane is the xz-plane.

Figure 6A:
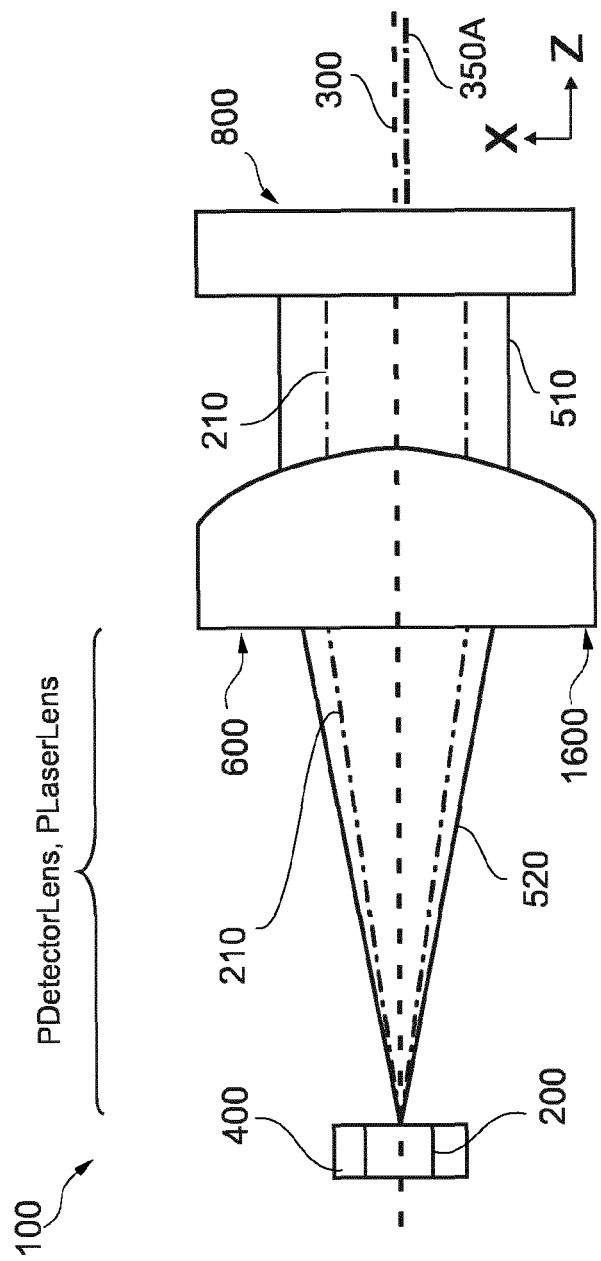
FIG. 6A, FIG. 6B, and FIG. 6C show a view of the examples of FIG. 1B and FIG. 2B.
Figure 6B:
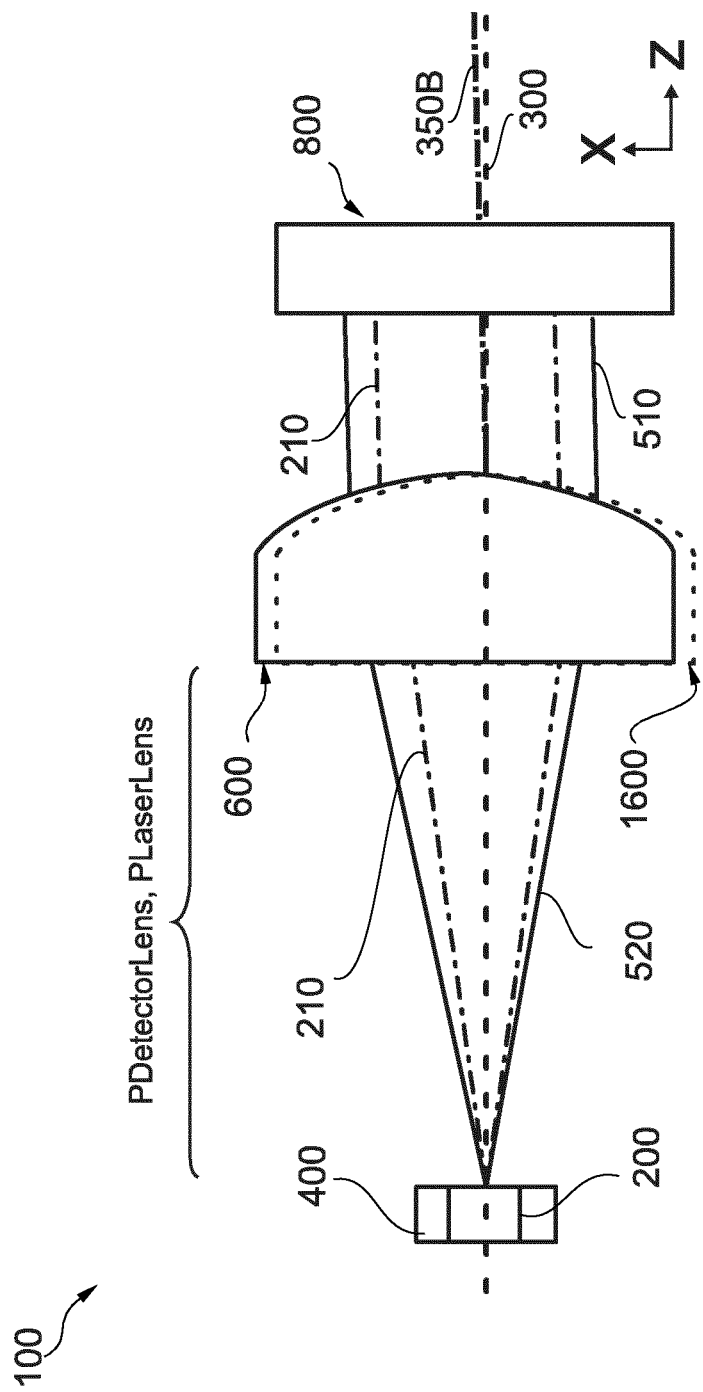

As exemplified in figures FIG. 2B, FIG. 6A-6B, a first projected length PLaserLens of an effective focal length of the transmit lens segment into the first plane xy, and a second projected length PDetectorLens of a focal length of the receive lens segment projected into the first plane xy may be essentially identical.

Such configurations may have the advantage that if the segmented lens 600 is moved by the lens actuator 1000 the secondary light may still reach the detector.

In other words, the LIDAR system may be configured in a way that the receive lens segment and the transmit lens segment are optically conjugate in at least one projection plane of the optical setup.

In some examples, the movement of the segmented lens 600 actuated by the lens actuator 1000 along the actuation direction 1010 may act to move the transmit-and-receive direction 350A, 350B, 350C of the primary and secondary light essentially in the xz-plane. In some examples, the scanning element 800 only has one degree of freedom and acts to modify the transmit-and-receive direction 350A, 350B, 350C in the xy-plane. This may allow for a simplified setup, because the movement of the segmented lens 600 complements the deflection of one or more scanning mirrors of the scanning element 800.

Figure 3A:
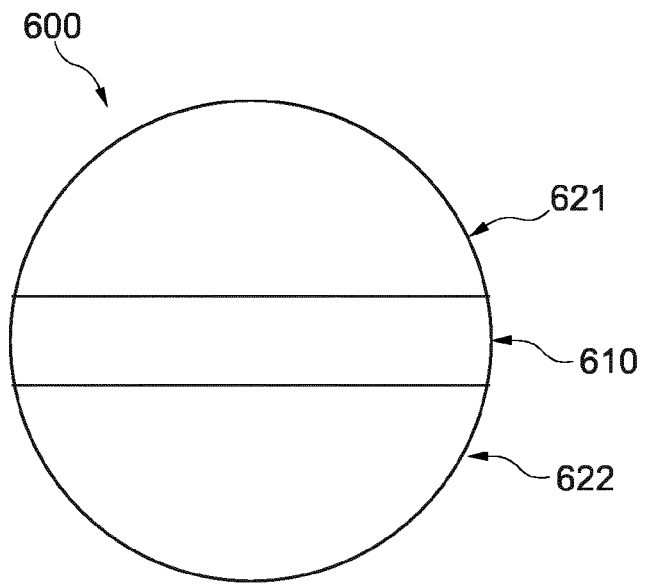
FIG. 3A and FIG. 3B schematically illustrate a segmented lens according to various examples.
Figure 3B:
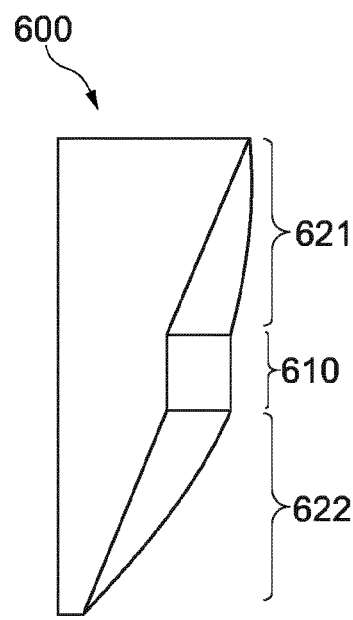

FIG. 3A and FIG. 3B schematically illustrate a segmented lens according to various examples.

FIG. 3A shows a frontal view of an example of the segmented lens 600.

FIG. 3B shows a side-view of the segmented lens 600 of FIG. 3A.

Figure 4A:
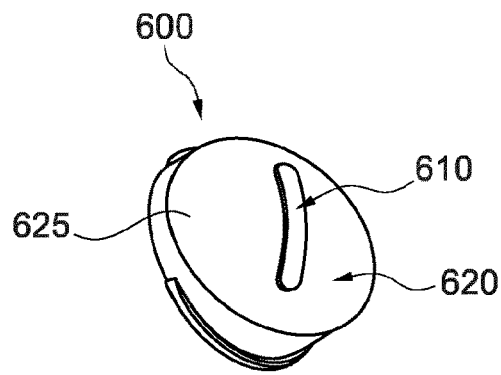
FIG. 4A, FIG. 4B, and FIG. 4C schematically illustrate an example of a segmented lens according to various examples.
Figure 4B:
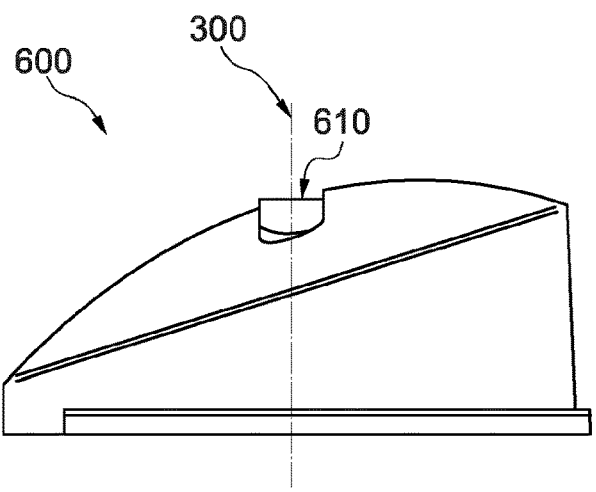
Figure 4C:
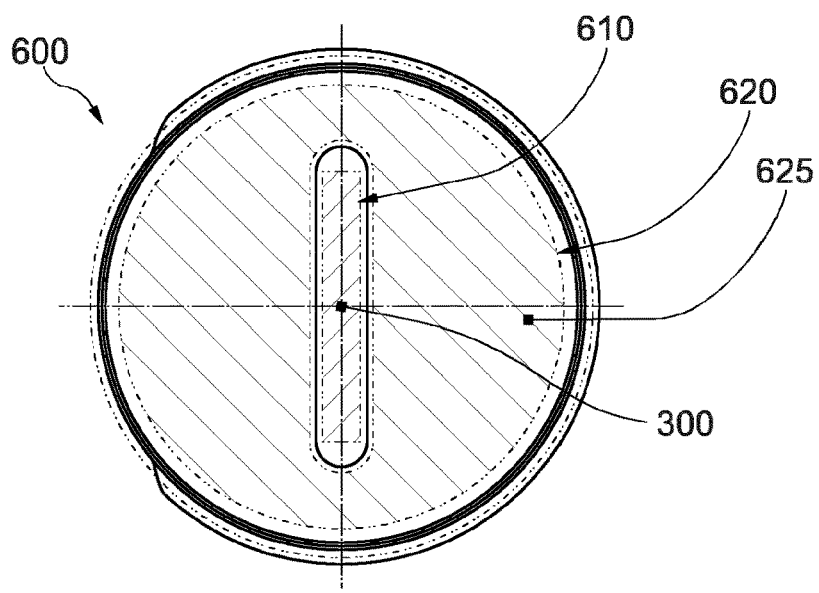

FIG. 4A, FIG. 4B, and FIG. 4C schematically illustrates an example of a segmented lens according to various examples.

The segmented lens 600 of the FIG. 4A-FIG. 4C is an alternative example compared to FIG. 2A and FIG. 3A, FIG. 3B.

Figure 6C:
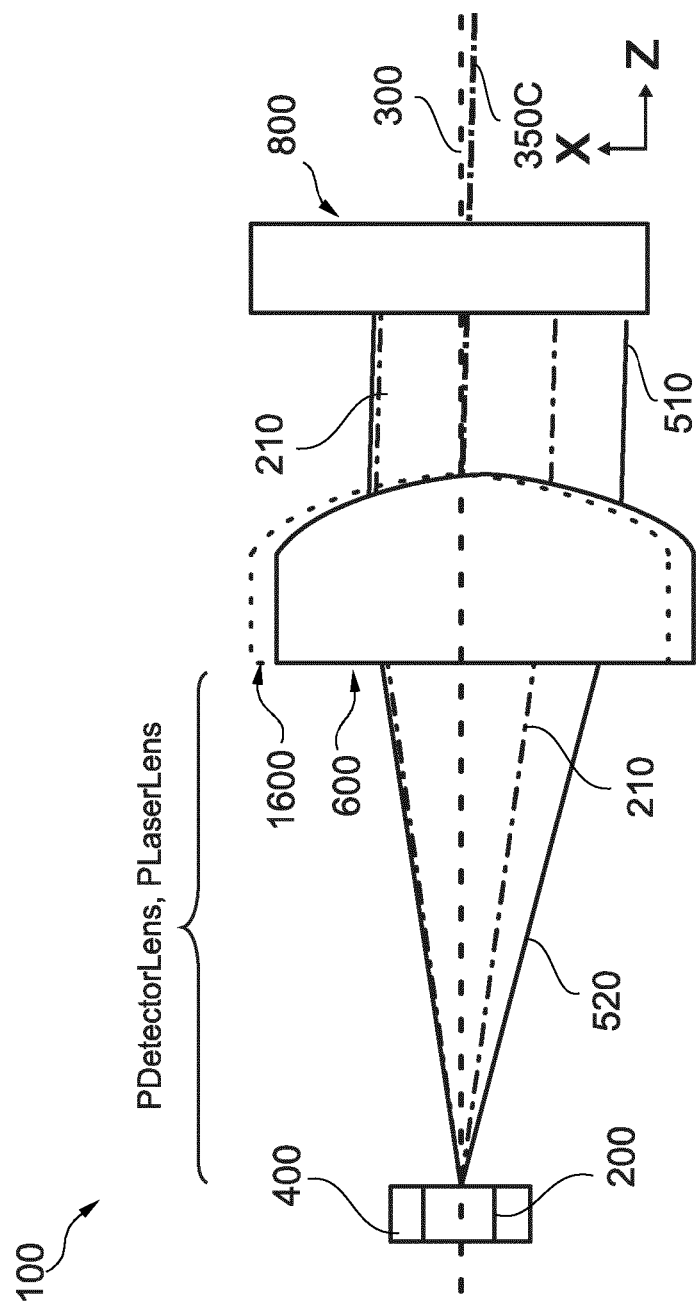

FIG. 6A, FIG. 6B, and FIG. 6C show a view of the xz-plane of the examples of FIG. 1B and FIG. 2B.

The example of FIGS. 4A-C is manufactured from two different lenses. The transmit lens segment 610 is installed in a groove manufactured into a larger off-axis lens, which acts as the receive lens segment 620. The surface 625 of the receive lens segment 620 does not define an inclination with respect to the center line 300 and thus does not possess rotational symmetry with respect to the center line 300.

By providing the second part 520 of the receive beam 500 inclined with respect to the center line 300, it is possible in some examples to reduce the required volume and to simplify the mechanical setup of the detector and the laser. Further, the required volume can be further reduced by an appropriate relative positioning of the detector 400 and the laser 200. This will be illustrated in the following with reference to FIG. 5.

Figure 5:
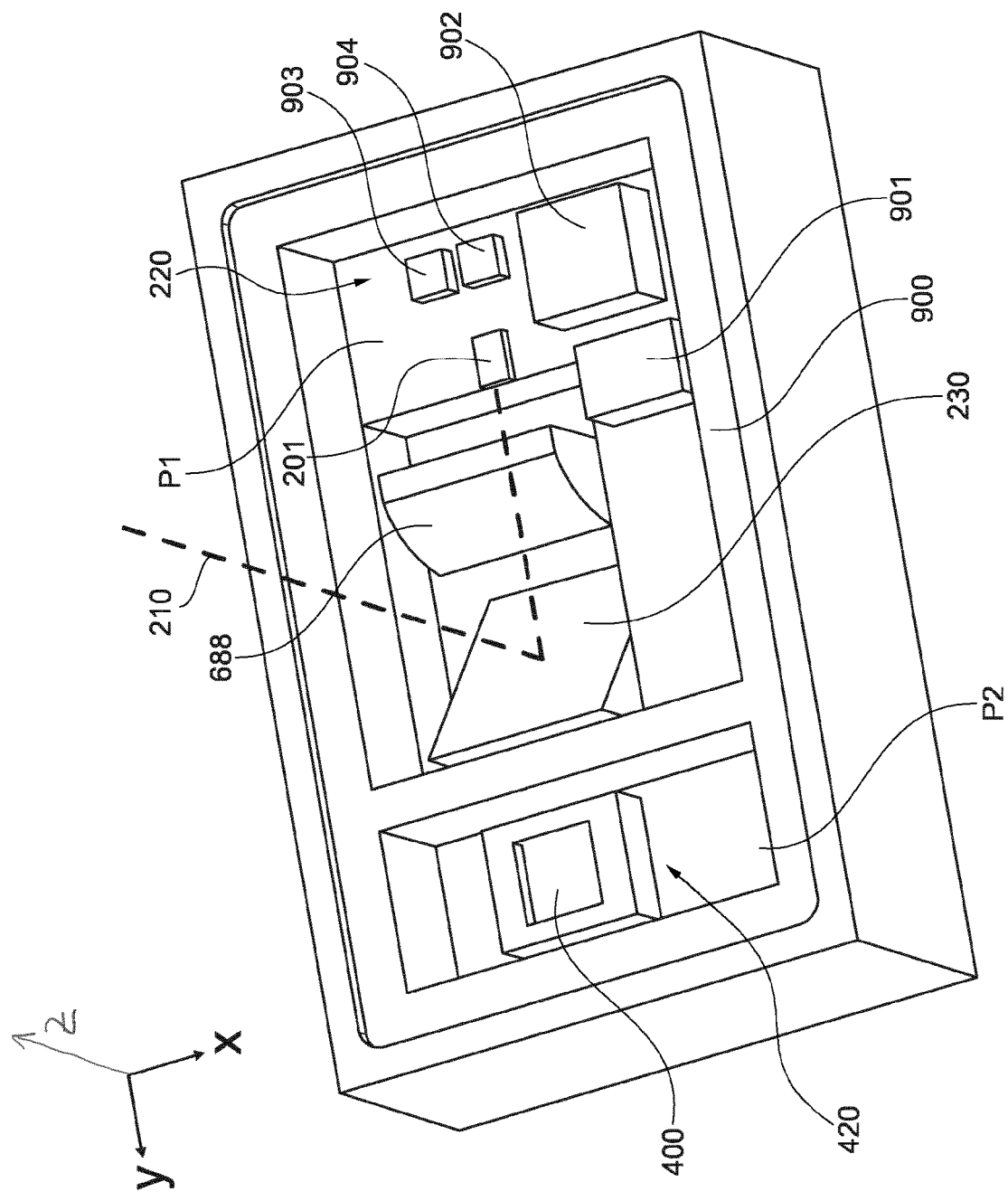
FIG. 5 schematically illustrates a laser/detector setup according to various examples.

FIG. 5 schematically illustrates a laser/detector arrangement according to various examples. In this example, the laser 200 has a first substrate 220 extending in a first plane P1. In this example, the laser is an edge-emitter laser diode 201, configured to emit the primary light in parallel to a first plane P1. The laser light passes through a fast-axis collimator lens 688 and is then guided onto the center line by a mirror 230 to provide the transmit beam 210.

The detector 400 has a second substrate 420 extending in a second plane P2. In the example of FIG. 5, the first plane P1 and the second plane P2 coincide. In this example the population of the substrates, for example with the laser 200, the detector 400, and other electrical components 901, 902, 903, 904 is greatly simplified. In some examples P1 and P2 are separated, for example to allow for an additional degree of freedom when optimizing the optical setup. A housing 900 can be provided to avoid stray light. Note that the detector 400 is shown without a pin-hole aperture which may be provided in some examples.

In the example of FIG. 5, a coordinate system is shown. The coordinate system of FIG. 5 corresponds to the coordinate systems of FIG. 1A and/or FIG. 1B. Note that while in FIG. 1A and FIG. 1B the transmit beam 210 is directed in a straight line between the laser 200 and the segmented lens 600 and thus in negative z-direction, in FIG. 5 the transmit beam first propagates parallel to the y-axis before interacting with the mirror 230. The mirror then deflects the transmit beam in a direction parallel to the z-axis, corresponding to the direction of propagation shown in the examples of FIG. 1A and FIG. 1B.

FIG. 6A, FIG. 6B, and FIG. 6C show a view of the xz-plane of the examples of FIG. 1B and FIG. 2B.

FIG. 6A shows the segmented lens 600 in a first position 1600. In the example shown, the primary light and the secondary light essentially propagates along the center line 300. Thus, the transmit-and-receive direction 350A is aligned with the center line 300.

In FIG. 6B, the segmented lens is moved with respect to the first position 1600. Such movement may be achieved by the lens actuator 1000 shown in FIG. 1B.

In FIG. 6B, the segmented lens at the first position 1600 is indicated as a dashed line for reference. In the example of FIG. 6B, the segmented lens is displaced in a positive x-direction compared to the first position 1600 and moved to a second position. As a result, both the primary light and secondary light between the segmented lens 600 and the object 110 are deflected; the transmit-and-receive direction 350B is inclined with respect to the center line 300.

FIG. 6C shows an example where the displacement of the segmented lens 600 is carried out in the negative direction along the x-axis compared to the first position 1600. The transmit-and-receive direction 350C is again inclined with respect to the center line 300.

In accordance with the examples described in connection with figures FIG. 1B and FIG. 2C, the projected distances PDetectorLens and PLaserLens in the xz-plane are identical. Therefore, in the examples according to FIGS. 6A-6C, the position of both the laser 200 and the detector 400 may remain fixed, irrespective of the position of the segmented lens 600.

Figure 7:
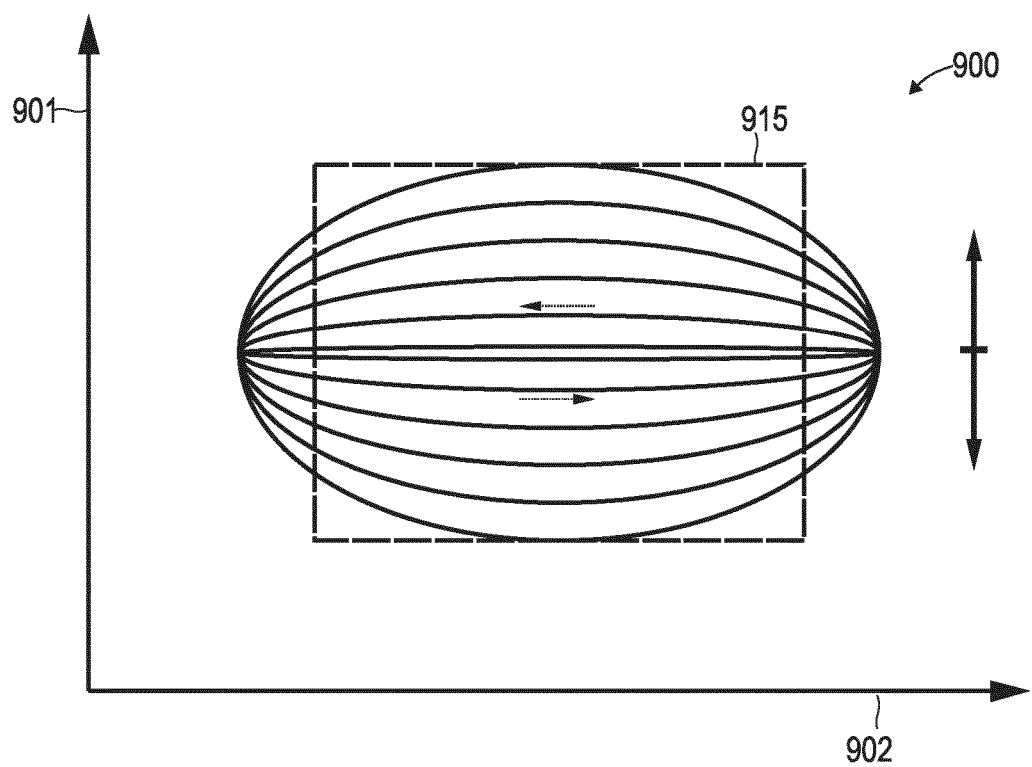
FIG. 7 shows movement patterns according to various examples.

FIG. 7 shows a movement pattern 900 as a function of a first angle 901 and a second angle 902. The movement pattern 900 illustrates the direction of the transmit-and-receive direction. The movement pattern 900 defines a scan area 915.

In a first example, e.g., as shown in FIG. 1A, the movement pattern 900 may be provided by the scanning element 800 alone. The scanning element 800 may be actuated by the further actuator of the scanning element as described herein. The further actuator may excite the torsional and/or transversal modes.

In a second example, the movement pattern 900 may be provided by the scanning element 800, wherein the lens actuator compensates for shock or external interferences along the first angle 901.

In a third example, the lens actuator, for example the lens actuator 1000 of FIG. 1B, is used to provide deflection of the transmit-and-receive direction along the first angle 901; while the scanning element 800 provides deflection of the transmit-and-receive direction along the second angle 902.

Such a movement pattern 900 may for example be used if one or two of the two degrees of freedom are provided by resonant processes, for example by resonant deflection of a mirror and/or resonant actuation of the segmented lens as described above.

This shape of the movement pattern 900 in the example of FIG. 7 is not limiting. In other examples, different shapes, for example scanning shapes, spiral-like shapes or meandering shapes may be used. In particular, the lens actuator 1000 can provide a stepped motion along the first angle 901, resulting in a meandering shape.

Figure 8:
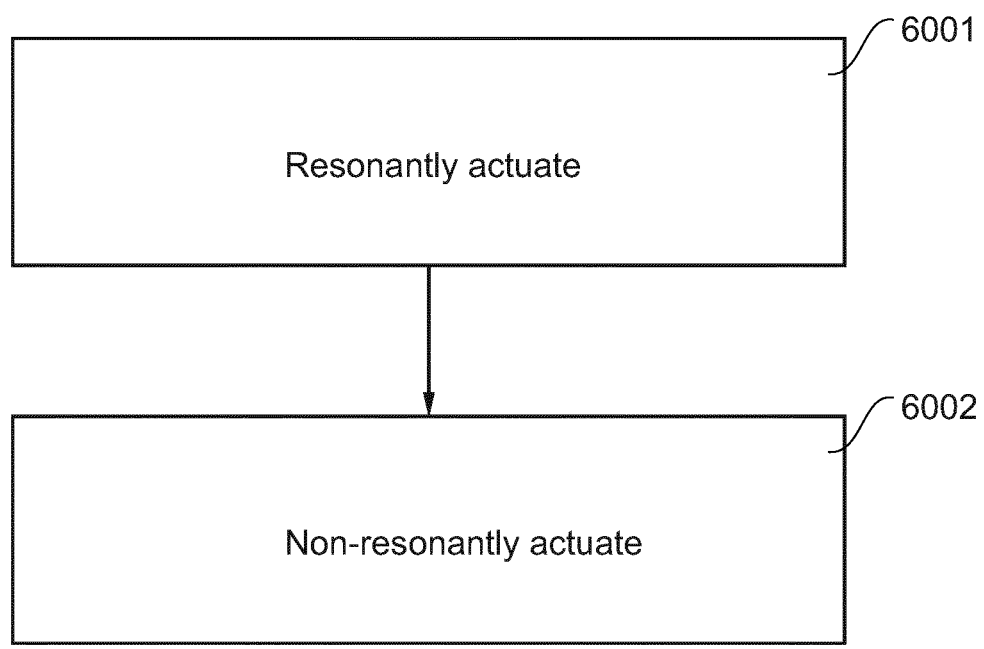
FIG. 8 is a flowchart of a method according to various examples.

FIG. 8 illustrates a respective method. FIG. 8 is a flowchart of a method according to various examples. The method of FIG. 8 could be executed by a control circuitry of a device. The method of FIG. 8 could be executed by a control unit—e.g., an ASIC or FPGA—of the LIDAR system 100 as described above.

At box 6001, a mass-spring system including one or more mirrors 800-1 and an elastic mount 800-2 is resonantly actuated. For example, a torsional or flexure eigenmode of one or more spring elements of the elastic mount 800-2 could be actuated.

At box 6002, the segmented lens 600 (or another lens in the transmit beam 210 and/or the receive beam 500) is actuated, e.g., non-resonantly.

For instance, the actuation could be in accordance with orthogonal degrees of freedom.

A first translational degree of freedom of a lens actuator can have an orthogonal component to a second translational degree of freedom of a further actuator of the mass-spring system.

Thereby, a superimposed scan pattern 900 and/or shock absorption could be provided.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

For illustration, above scenarios have been described in which the receive beam includes an off-axis component, i.e. a second part which has an inclination with respect to the center line. However, in other examples, it would also be possible that either the transmit beam associated with the primary light has an inclination with respect to the center line or that both the transmit beam and the receive beam include off-axis components, i.e. have an inclination with respect to the center line. In other words, alternatively or additionally to off-axis detection, it would be possible to employ off-axis emission. Combined off-axis emission and off-axis detection may have the further advantage that the compactness of the optical setup may be increased and/or that thinner and/or easier to manufacture lenses, for example but not limited to the segmented lens, may be used.

For further illustration, above, various scenarios have been described in which off-axis detection and/or off-axis transmission is combined with parallel planes on which the laser and the detector are mounted. Such techniques of mounting the laser and the detector on parallel planes could also be implemented without off-axis detection and/or off-axis transmission, e.g., using a conventional beam splitter or the like to separate the transmit beam and the receive beam.

The invention claimed is:

1. A LIDAR system for ranging an object using primary light and secondary light reflected at the object, the LIDAR system comprising:
    a laser, arranged to emit the primary light along a transmit beam towards a scanning element of the LIDAR system, wherein at least a part of the transmit beam adjacent to the scanning element defines a center line,
    a detector, arranged to detect the secondary light along a receive beam, wherein the receive beam comprises a first part aligned with the center line and a second part having an inclination with respect to the center line, wherein the second part of the receive beam is in-between the first part of the receive beam and the detector, and
    a segmented lens, positioned on the center line in-between the first part of the receive beam and the second part of the receive beam, the segmented lens comprising a transmit segment associated with the transmit beam and a receive segment associated with the receive beam, wherein the receive segment is arranged to focus the receive beam onto the detector, wherein the transmit segment comprises a first surface and wherein the receive segment comprises at least one second surface, wherein the first surface and the at least one second surface are connected via continuous transitions, and the receive segment comprises a first lens element and a second lens element having different geometrical lens parameters.

2. The LIDAR system of claim 1, further including a lens actuator, configured to provide a movement of the segmented lens.

3. The LIDAR system of claim 2, wherein the detector is arranged with a distance along a second axis perpendicular to the center line with respect to the laser to define the inclination of the second part of the receive beam, and wherein the lens actuator is configured to provide the movement of the segmented lens along a third axis, and wherein the third axis is essentially perpendicular to both the center line and the second axis.

4. The LIDAR system of claim 2, further including a further actuator of the scanning element configured to act upon one or more steering mirrors of the scanning element to provide a deflection to the one or more steering mirrors, wherein a frequency of operation of the movement is not larger than 50% if compared to a frequency of operation of the deflection of the one or more steering mirrors.

5. The LIDAR system of claim 4, wherein a first translational degree of freedom of the lens actuator has an orthogonal component to a second translational degree of freedom of the further actuator.

6. The LIDAR system of claim 4, wherein the lens actuator is configured to provide the movement of the segmented lens non-resonantly, and further wherein the further actuator is configured to provide the deflection of the one or more steering mirrors resonantly.

7. The LIDAR system of claim 4, wherein a mass of the mount and the one or more steering mirrors is not larger than 20% of a mass of the segmented lens.

8. The LIDAR system according to claim 1, wherein at least a second part of the transmit beam in between the scanning element and the object defines a transmit-and-receive direction between the LIDAR system and the object and wherein the receive beam is associated with the transmit-and-receive direction.

9. The LIDAR system according to claim 1, wherein a projection plane is defined by a third axis and a central axis and wherein:
   a first projected length of an effective focal length of the transmit segment into the projection plane, and
   a second projected length of a focal length of the receive segment projected into the projection plane are essentially identical.

10. The LIDAR system according to claim 1, wherein the transmit segment and the receive segment are effectively optically conjugate in at least one projection plane.

11. The LIDAR system according to claim 1, wherein at least one surface of at least one lens element of the receive segment does not possess rotational symmetry with respect to the center line.

12. The LIDAR system according to claim 1, wherein the transmit segment is arranged to at least partly collimate a slow axis of the transmit beam.

13. The LIDAR system according to claim 1, wherein the transmit segment and the receive segment of the segmented lens are integrally formed or wherein the transmit segment is embedded into the receive segment.

14. The LIDAR system according to claim 1, wherein the transmit segment and the receive segment have different indices of refraction.

15. The LIDAR system according to claim 1, wherein the transmit segment implements a cylindrical lens element or a bifocal lens element.

16. The LIDAR system according to claim 1, wherein the segmented lens comprises a flat surface oriented perpendicular to the center line.

17. The LIDAR system according to claim 1, wherein the laser has a first substrate extending in a first plane and wherein the detector has a second substrate extending in a second plane, wherein the first plane and the second plane are parallel to each other.

18. The LIDAR system according to claim 1, wherein the center line forms an optical axis of the transmit beam and the receive beam adjacent to the scanning element.

19. A LIDAR system for ranging an object using primary light and secondary light reflected at the object, the LIDAR system comprising:
   a laser, arranged to emit the primary light along a transmit beam towards a scanning element of the LIDAR system, wherein at least a part of the transmit beam adjacent to the scanning element defines a center line,
   a detector, arranged to detect the secondary light along a receive beam, wherein the receive beam comprises a first part aligned with the center line and a second part having an inclination with respect to the center line, wherein the second part of the receive beam is in-between the first part of the receive beam and the detector, and
   a segmented lens, positioned on the center line in-between the first part of the receive beam and the second part of the receive beam, the segmented lens comprising a transmit segment associated with the transmit beam and a receive segment associated with the receive beam, wherein the receive segment is arranged to focus the receive beam onto the detector, wherein a projection plane is defined by a third axis and a central axis and wherein:
      a first projected length of an effective focal length of the transmit segment into the projection plane, and
      a second projected length of a focal length of the receive segment projected into the projection plane are essentially identical.

20. A LIDAR system for ranging an object using primary light and secondary light reflected at the object, the LIDAR system comprising:
   a laser, arranged to emit the primary light along a transmit beam towards a scanning element of the LIDAR system, wherein at least a part of the transmit beam adjacent to the scanning element defines a center line,
   a detector, arranged to detect the secondary light along a receive beam, wherein the receive beam comprises a first part aligned with the center line and a second part having an inclination with respect to the center line, wherein the second part of the receive beam is in-between the first part of the receive beam and the detector, and
   a segmented lens, positioned on the center line in-between the first part of the receive beam and the second part of the receive beam, the segmented lens comprising a transmit segment associated with the transmit beam and a receive segment associated with the receive beam, wherein the receive segment is arranged to focus the receive beam onto the detector, wherein at least one surface of at least one lens element of the receive segment does not possess rotational symmetry with respect to the center line.

\* \* \* \* \*